United States Patent [19]

Solomon

[11] 4,067,788
[45] Jan. 10, 1978

[54] ELECTROCHEMICAL PRODUCTION OF FINELY DIVIDED METAL OXIDES, METAL HYDROXIDES AND METALS

[75] Inventor: Frank Solomon, Great Neck, N.Y.

[73] Assignee: Electromedia, Inc., Englewood, N.J.

[21] Appl. No.: 724,497

[22] Filed: Sept. 20, 1976

[51] Int. Cl.² ............................................. C25G 1/00
[52] U.S. Cl. ................................................... 204/96
[58] Field of Search ........................................ 204/96

[56] References Cited

U.S. PATENT DOCUMENTS

| | | | |
|---|---|---|---|
| 3,003,935 | 10/1961 | Brown | 204/96 |
| 3,124,520 | 3/1964 | Juda | 204/86 |

*Primary Examiner*—R. L. Andrews

*Attorney, Agent, or Firm*—Blum, Moscovitz, Freidman & Kaplan

[57] ABSTRACT

In a method of production of finely divided metal oxides, metal hydroxides and metals, current is passed between an anode of a selected metal and an air electrode acting as the cathode in a cell containing a weakly alkaline electrolyte. The anion of the electrolyte is such that it does not form an insoluble salt with the metal of the anode. Metal ions issuing from the metal anode make contact with hydroxyl ions in the solution and form finely divided oxides or hydroxides. The oxides or hydroxides are removed and chemically reduced to finely divided metal particles. The voltage necessary for carrying out the oxidation of the metal to metal ions is reduced through the use of an air electrode as cathode, thereby reducing the cost of the process.

12 Claims, 1 Drawing Figure

U.S. Patent   Jan. 10, 1978   4,067,788
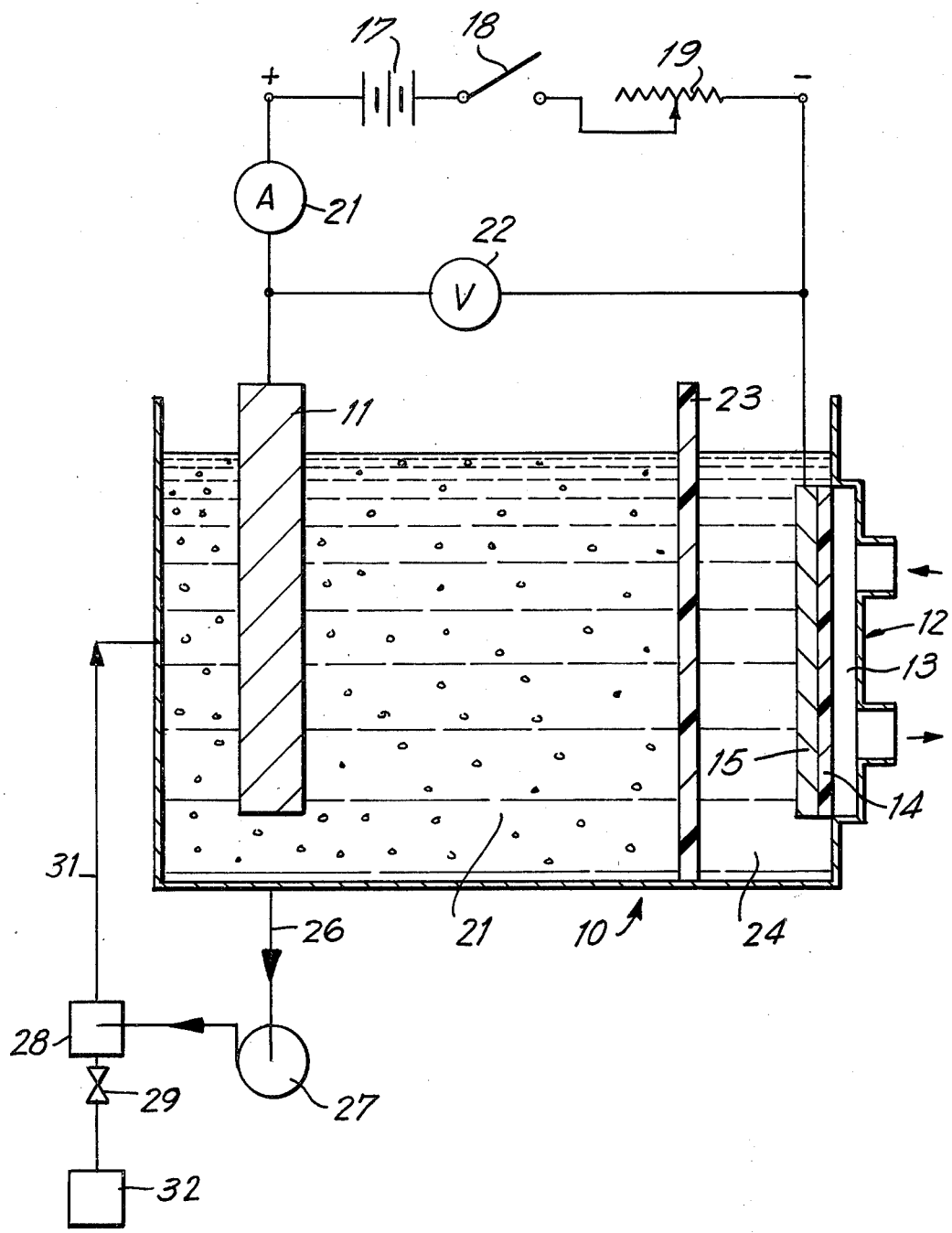

ELECTROCHEMICAL PRODUCTION OF FINELY DIVIDED METAL OXIDES, METAL HYDROXIDES AND METALS

BACKGROUND OF THE INVENTION

Finely divided metals, as well as metal oxides and hydroxides, have a variety of uses, such as in the construction of positives in electrochemical energy supplies and as catalysts. A variety of techniques have been used for the production of these materials, that disclosed by K. N. Brown in U.S. Pat. No. 3,003,935 being illustrative of the manufacture of argentous oxide. Brown discloses a cell using two electrolytes, a silver ingot anode and a steel cathode. The silver anode is placed in an electrolyte of 10% $NaNO_3$ adjusted to a pH of 9-11 with an alkali such as sodium hydroxide or potassium hydroxide. The steel cathode is immersed in a second electrolyte, namely, the catholyte, in a cathode cup containing an alkali such as sodium hydroxide. At the anode, the silver is converted into argentous ions, which react with hydroxyl ions in the alkaline solution to form $Ag_2O$, which falls to the bottom of the vessel. The bottom of the vessel stops so that the $Ag_2O$ moves to the lowest portion thereof, from which it can be withdrawn through an appropriate valve.

At the steel cathode, hydrogen is generated. Brown expresses the concern that nitrate ion reaching the cathode may be reduced to ammonia, which, in contact with the argentous oxide, could form the extremely explosive silver azide. Consequently, Brown finds it necessary to maintain the level in the catholyte compartment of the cell higher than that of the anolyte, so that there is a tendency for the catholyte to flow into the anolyte instead of vice versa, thereby preventing nitrate ion from reaching the cathode.

By the technique disclosed by Brown, argentous oxide varying in particle size from 0.7 to 1.2 microns is obtained.

Needless to say, the requirement of a catholyte cup and maintaining the level of the electrolyte in the catholyte cup above that in the remainder of the cell introduces difficulties as well as restrictions on the process. Also, the particle size range obtained by the process of Brown is limited. Furthermore, although Brown does not comment on the point, there is a substantial overvoltage involved in the evolution of hydrogen on a steel cathode, this overvoltage, when multiplied by the current used for the production of the argentous oxide, being a measure of the energy wasted in the process.

It would therefore be desirable that a process be available which provides for a wider range of particle sizes produced by said process, which avoids the complexities of the Brown cell construction, and which eliminates the overvoltage loss at the cathode. In addition, Brown discloses a process which produces only argentous oxide, whereas oxides of other metals, and particularly, finely divided metal powders obtained from such oxides are also valuable, so that a process which makes a variety of oxides, hydroxides and metals in finely divided form available would be highly desirable.

SUMMARY OF THE INVENTION

An anode consisting of a metal to be finely divided as the oxide, the hydroxide or the metal itself is immersed in a weakly alkaline solution of a salt, the anion of which is soluble when combined with said metal. The metal is made anodic, the cathode being a catalyzed air electrode. Said air electrode may be in the same electrolyte as the anode or may be in an alkaline electrolyte separated by a semipermeable membrane or porous membrane from the anolyte. The preferred method is to use a single electrolyte.

Preferably, the electrolyte in which the oxide or hydroxide is formed is filtered continuously for the removal of said oxide or hydroxide. For control of the particle size of said oxide or hydroxide, a portion of the solid material is returned to the cell in which the process is carried out, said returned solid serving as nuclei on which additional oxide or hydroxide is deposited, thus increasing the size of the particles.

The final step in the process is the chemical reduction of the oxide or hydroxide to the finely divided metal. Preferred reductants are formaldehyde and invert sugar.

Accordingly, an object of the present invention is a process for producing finely divided metal oxides and hydroxides which are insoluble in dilute alkali and finely divided metal powders.

Another object of the present invention is a process for producing finely divided metal oxides, hydroxides and metal powders, said metals including nickel, silver, gold and the platinum group of metals.

A further object of the present invention is a method of producing finely divided metal powders ranging in size from about $0.5\mu$ to about $10\mu$.

An important object of the present invention is an electrochemical method of producing finely divided metal oxides and hydroxides and metal powders using lower voltages than has hitherto been the case.

Still other objects and advantages of the invention will in part be obvious and will in part be apparent from the specification.

The invention accordingly comprises the several steps and the relation of one or more of such steps with respect to each of the others thereof which will be exemplified in the method hereinafter disclosed, and the scope of the invention will be indicated in the claims.

BRIEF DESCRIPTION OF THE DRAWING

For a fuller understanding of the invention, reference is had to the following description, taken in connection with the accompanying drawing, in which:

The Single FIGURE shows, in elevated sectional view, a cell and associated apparatus for carrying out the process of the present invention.

DESCRIPTION OF THE PREFERRED EMBODIMENTS

The process of the present invention is intended for producing finely divided metal oxides, metal hydroxides and metal powders by way of a simpler process and at lower cost than has hitherto been the case. Metals to which the present process is particularly applicable are nickel, silver, gold and the platinum group of metals. Of these, silver is the preferred metal due to its importance in finely divide form, either as a metal or as argentous oxide.

Apparatus for carrying out the method of the present invention is shown in the Single FIGURE, in which an electrochemical cell is represented generally by the reference numeral 10. Anode 11 of the cell consists of the metal to be converted into a finely divided powder of the metal itself, or a hydroxide or an oxide. Where the metal is silver, it is in ingot form. The cathode of the cell is indicated generally by the reference numeral 12. It consists of a chamber 13 through which air is circulated, as indicated by the arrows, a hydrophobic layer 14, generally of Teflon, and a catalytic layer 15 at which oxygen is converted to hydroxyl ion, thereby avoiding production of hydrogen. It is through the use of the air electrode 12 that the voltage necessary for driving the current through the cell is decreased.

The driving voltage may be supplied by a battery 17 or by a DC power supply (not shown). A switch 18 is provided for turning the current on and off, and the current density is controlled through the use of a device such as resistor 19. The amperage and voltage are read by the instruments 21 and 22, as shown. Electrolyte 21 may be sodium nitrate, potassium nitrate, sodium acetate or potassium acetate. The principal restriction on the electrolyte in contact with the anode 11 is that its anion must not form an insoluble salt with the metal from anode 11 when converted into ionic form by passage of the current.

The Single FIGURE shows the cell divided into two compartments by separator 23. Where a divided cell is used, it is desirable that electrolyte 24 be sodium hydroxide or potassium hydroxide. A concentration of about 10% is satisfactory, though the concentration is not critical. It should be noted, however, that due to the fact that the cathode reaction consists of the reduction of oxygen, there is no danger of reduction of nitrate associated with the use of the air electrode. Consequently, so far as this difficulty is concerned, there is no necessity for the use of the divider membrane 23. Accordingly, preferably, a single electrolyte is used for the entire cell.

As aforenoted, the current density can vary between about 20 mA/cm$^2$ and 200 mA/cm$^2$, the area being based on the air cathode.

The saving in voltage provided by the use of an air cathode as against a conventional steel cathode can be seen from the fact that at a current density of 40 mA/cm$^2$, with air passing through the cathode, the voltage required is 3.39, whereas when the air is cut off, the voltage required is 4.33. The difference is almost 1.0 volts, this difference representing the overvoltage for generation of hydrogen on the surface of the air electrode.

I have observed that in the weakly alkaline solutions disclosed herein, a pH range of 8 to 12 being acceptable, and a pH range of 9 to 12 being preferred, the metal ions produced at the surface of anode 11 do not react immediately with the hydroxyl ions of the solution, the insoluble oxides or hydroxides being formed at a perceptible distance from the surface of the anode. It is this factor which makes it possible to control the size of the particles by recirculation of the electrolyte or by stirring same. A preferred method of recirculation is shown in the Single FIGURE, the suspension being withdrawn continually through duct 26 by pump 27. Pump 27 sends the suspension to filter 28, which may be of the continuous drum type. A portion of the solids is removed through valve 29 to be used as such (after drying) or to be reduced to the metal. The remainder of the solids, with the accompanying electrolyte, is recirculated through duct 31 to cell 10 in the vicinity of anode 11. The finely divided particulate oxides or hydroxides, when brought in contact with anode 11, serve as nuclei for deposition of further oxide or hydroxide, and thereby for increase in the average particle size. The final particle size is determined by the fraction of the solid matter recirculated. By this means, particles in the range from about 0.5 $\mu$ to about 10 $\mu$ can be obtained.

The solids withdrawn through valve 29 are taken to a dryer 32, which may be of the tray dryer type. Preferably, the oxidized metal should not be taken up to a temperature at which it can decompose, since it has a tendency to sinter. The preferred method of reducing the oxide or hydroxide is by means of an effective reductant, namely, one having a reduction potential sufficient for converting the oxide or hydroxide to the metal. In the case of silver and with most other metals, the preferred reductants are aqueous formaldehyde and aqueous invert sugar, these compounds being preferred from the standpoint of cost and speed of reaction. Finally, if desired, the metal powder is dried.

Where the cell electrolyte is divided, as shown in the Single FIGURE, any semipermeable material or porous material where the pores are sufficiently small so that the oxide or hydroxide particles will not pass therethrough can be used. A particularly satisfactory material is Celgard microporous polypropylene. However, porous ceramic materials can also be used successfully.

It will thus be seen that the objects set forth above, among those made apparent from the preceding description, are efficiently attained, and since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electrochemical method of manufacturing metal oxide and metal hydroxide particles in the size range from 0.5 $\mu$ to 10 $\mu$, comprising the step of passing direct current in a cell between an anode of a selected metal and an air cathode, said anode and cathode being immersed in a weakly alkaline electrolyte, said electrolyte being free of anions which can form insoluble salts with ions of said selected metal, said metal being such that on conversion to ionic form by passage of said current it forms an insoluble particulate oxide or insoluble particulate hydroxide on contact with hydroxyl ion.

2. The electrochemical method of claim 1, further comprising the step of chemically reducing the insoluble particulate product of the reaction of said metal in ionic form with said hydroxyl ions.

3. The electrochemical method of claim 2, wherein said insoluble particulate product is chemically reduced by a member of the group consisting of formaldehyde and invert sugar.

4. The electrochemical method of claim 2, wherein said insoluble particulate product is Ag$_2$O.

5. The electrochemical method of claim 1, wherein said first electrolyte is circulated through a filter for removal of at least part of the insoluble particulate metal product formed by passage of said current.

6. The electrochemical method of claim 5, wherein a portion of said circulated electrolyte carrying insoluble particulate product is recirculated to said cell, whereby insoluble particulate product in the immediate vicinity of said anode serves as a nucleus for deposition of further product thereof and increase in particle size.

7. The electrochemical method of claim 1, wherein said current is passed at a current density between about 20 mA/cm$^2$ and 200 mA/cm$^2$, based on the area of said air cathode.

8. The electrochemical method of claim 1, wherein said electrolyte is selected from the group consisting of aqueous NaNO$_3$, KNO$_3$, sodium acetate and potassium acetate adjusted to a pH of 9–11.

9. The electrochemical method of claim 1, wherein said electrolyte is aqueous NaNO$_3$ at a concentration of about 10%.

10. The electrochemical method of claim 1, wherein said selected metal is selected from the group consisting of nickel, silver, gold and the platinum group of metals.

11. The electrochemical method of claim 1, wherein said selected metal is silver.

12. An electrochemical method of manufacturing metal oxide and metal hydroxide particles in the size range from 0.5 $\mu$ to 10 $\mu$, comprising the step of passing direct current in a cell between an anode of a selected metal and an air cathode, said anode being immersed in a weakly alkaline first electrolyte, said first electrolyte being free of anions which can form insoluble salts with ions of said selected metal, said metal being such that on conversion to ionic form by passage of said current it forms an insoluble particulate oxide or insoluble particulate hydroxide on contact with hydroxyl ions, said air electrode being immersed in a second electrolyte connected with said first electrolyte for ionic transport therebetween through a separation means permeable to the ions in said electrolytes.

* * * * *